(12) United States Patent
Miller

(10) Patent No.: US 6,871,681 B2
(45) Date of Patent: Mar. 29, 2005

(54) DOWEL CONNECTION SYSTEM AND METHOD

(75) Inventor: Michael R. Miller, Winnetka, IL (US)

(73) Assignee: Miller Dowel Company, Winnetka, IL (US)

(*) Notice: Subject to any disclaimer, the term of this patent is extended or adjusted under 35 U.S.C. 154(b) by 135 days.

(21) Appl. No.: 10/302,402

(22) Filed: Nov. 22, 2002

(65) Prior Publication Data

US 2004/0099339 A1 May 27, 2004

(51) Int. Cl.⁷ .............................. B27F 1/00; F16B 12/36
(52) U.S. Cl. ..................... 144/347; 144/353; 144/354; 403/283; 403/292; 403/298; 411/530
(58) Field of Search ................................. 144/344, 346, 144/347, 353, 354; 403/274, 279, 280, 283, 292, 298, 373, 374.1, 408.1, 409.1; 411/513, 530

(56) References Cited

U.S. PATENT DOCUMENTS

| | | |
|---|---|---|
| 100,055 A | 2/1870 | Montgomery |
| 332,308 A | 12/1885 | Valentine |
| 876,985 A | 1/1908 | Malancon |
| RE13,915 E | 5/1915 | Evans |
| 1,229,565 A | 6/1917 | Ahlgren |
| 2,667,795 A | 2/1954 | Bowen |
| 2,817,620 A * | 12/1957 | Brown et al. ............... 156/294 |
| 3,104,430 A * | 9/1963 | Badali ......................... 403/13 |
| 3,153,283 A | 10/1964 | Weissman |
| 3,221,458 A | 12/1965 | Lucas |
| 3,527,486 A | 9/1970 | Gamp |
| 3,575,520 A | 4/1971 | Halpern |
| 3,635,573 A | 1/1972 | Halpern |
| 3,756,635 A * | 9/1973 | Beers ......................... 312/111 |
| 3,850,054 A | 11/1974 | Weissman |

(Continued)

FOREIGN PATENT DOCUMENTS

| | | |
|---|---|---|
| CA | 465953 | 6/1950 |
| CN | 663 069 A5 | 11/1987 |
| DE | 1 947 456 | 9/1970 |
| DE | 3820351 A1 | 12/1989 |
| FR | 663 069 A5 | 8/1929 |
| GB | 11581 | 8/1887 |
| GB | 221280 | 9/1924 |
| IT | 475429 | 10/1952 |

OTHER PUBLICATIONS

Industrial Fastener Institute "Fastener Standards" 5th Edition, (c) 1970, p. L–12.
1 page from http://pc-78-120.udac.se:8001/WWW/Nautica/Shipbuilding/Fastening/Curtis(1918).html (Oct. 24, 2002).

Primary Examiner—Allen Ostrager
Assistant Examiner—Shelley Self
(74) Attorney, Agent, or Firm—Welsh & Katz, Ltd.

(57) ABSTRACT

An embodiment of the connection system is for connecting a plurality of components together. One embodiment of a method of the system provides a dowel having first and second portions. Each of the portions has first and second ends, the first and second portions being connected to one another at their second ends. At least one portion of the first and second portions has at least three dowel sections of successively decreasing diameters. One of these dowel sections has a side wall and an end wall that forms the first end of the at least one portion and each of the other dowel sections has a side wall and step wall. A first component has a first opening configured to substantially fit the first portion, and a second component has a second opening configured to substantially fit the second portion. An adhesive material is then applied on at least part of the first portion, and the first portion is inserted into the first opening in the first component. Adhesive material is then also applied on at least a part of the second portion, and the second portion is inserted into the second opening in the second component, thereby connecting together the two components.

41 Claims, 8 Drawing Sheets

U.S. PATENT DOCUMENTS

| | | | |
|---|---|---|---|
| 3,883,258 A | * | 5/1975 | Hewson ...................... 403/298 |
| 4,128,356 A | | 12/1978 | Carlisle |
| 4,340,327 A | | 7/1982 | Martins |
| 4,518,291 A | | 5/1985 | Lang et al. |
| 4,536,044 A | | 8/1985 | Ziegelheim et al. |
| 4,639,197 A | | 1/1987 | Tornare et al. |
| 4,793,745 A | | 12/1988 | Ashbaugh et al. |
| 4,815,902 A | | 3/1989 | Durfee, Jr. |
| 4,884,571 A | | 12/1989 | Baker |
| 5,100,162 A | | 3/1992 | Lo |
| 5,131,783 A | | 7/1992 | Asti |
| 5,232,302 A | | 8/1993 | Wagner et al. |
| 5,265,988 A | | 11/1993 | Schmigalla et al. |
| 5,326,196 A | | 7/1994 | Noll |
| 5,529,424 A | * | 6/1996 | Neubert et al. ............. 403/298 |
| D371,302 S | | 7/1996 | Spirer |
| 5,768,845 A | | 6/1998 | Beaulieu et al. |
| 5,771,650 A | | 6/1998 | Williams et al. |
| D426,766 S | | 6/2000 | Burchall et al. |
| 6,267,527 B1 | * | 7/2001 | Miller ........................ 403/292 |
| D456,700 S | | 5/2002 | Miller et al. |
| D484,781 S | | 1/2004 | Miller |

* cited by examiner

DOWEL CONNECTION SYSTEM AND METHOD

CROSS REFERENCE TO RELATED APPLICATIONS

This application relates to U.S. Pat. Nos. 6,267,527 and D456,700, both of which are hereby incorporated by reference.

FIELD OF THE INVENTION

The present invention relates to dowel connection systems, and more particularly to dowel systems having dowels that provide for decreasing diameters over at least a portion of the length of the dowel and that provide enhanced connection of adjoining components.

BACKGROUND

Dowels of various types are known in the art. Such devices are typically used in the furniture industry for joining the various components of a furniture assembly. Dowels are used in other industries as well, for example, dowels may be used to join landscaping timber. During construction, a dowel is driven into an opening, such as a circular shaped bore, of one of the furniture components that comprise the assembly. The second furniture component to be connected to the first furniture component is also provided with an opening for the dowel. The opening in the second furniture component is aligned with the opening in the first furniture component. The dowel that is mounted to the first component is then inserted and driven into the opening in the second component. Pressure may be applied to the two components when the dowel is being driven into the opening in the second component. Since typically the diameter of the dowel is greater in size then the diameters of the openings, the dowel is held in the openings by the frictional forces exerted on the dowel's outer sidewalls by the inner sidewalls of the openings in the two components.

However, existing dowels known in the art have some inherent disadvantages. One of the disadvantages with existing dowels is that, when inserting the dowel in the openings of the adjoining components, a high pressure must be applied to overcome the frictional force which acts on the contact surface between the outer wall surface of the dowel and the inner wall surface of the opening and acts opposite to the dowel's insertion direction. As a result, when the dowel is inserted into the openings, an undesirable deformation of the opening's inner wall surface may occur. This deformation may impair the connection of the dowel with the component. Further, if the dowel experiences extreme stress the dowel may be damaged and may break. Safety issues are also a concern, if the stresses on the dowel are such that the dowel splits into more than one piece, the dowel may break or splinter and cause injure to the user.

A further drawback of known dowels and their use occurs when a dowel is coated with a glue or adhesive material and inserted into a hole in a piece of wood for example. Because of the tight fit and because the glue tends to create a seal, as the dowel is pushed into the hole, air pressure builds in the hole and tends to push the dowel back out of the hole. This prevents the dowel from being fully inserted into the hole, and thus causes the furniture components to separate. Also during insertion of the dowel, a portion of the glue material is scrapped off the sides of the dowel, while another portion of the glue material builds up in the bottom of the hole. Thus, there is a need for an improved dowel connection system that overcomes these disadvantages and drawbacks of the known dowel connection systems.

SUMMARY

In general terms, one embodiment of the connection system is for connecting a plurality of components together. One embodiment of a method of the system comprises providing a dowel having first and second portions. Each of the portions has first and second ends, the first and second portions being connected to one another at their second ends. At least one portion of the first and second portions has at least three dowel sections of successively decreasing diameters. One of these dowel sections has a side wall and an end wall that forms the first end of a respective portion and each of the other dowel sections has a side wall and step wall. An embodiment of the method further comprises providing a first component having a first opening configured to substantially fit the first portion, and a second component having a second opening configured to substantially fit the second portion. An adhesive material may be applied on at least part of the first portion, and the first portion is inserted into the first opening in the first component. Adhesive material may also be applied on at least a part of the second portion, and the second portion is inserted into the second opening in the second component, thereby connecting together the two components.

BRIEF DESCRIPTION OF THE DRAWINGS

The features of the present invention which are believed to be novel are set forth with particularity in the appended claims. The invention may best be understood by reference to the following description taken in conjunction with the accompanying drawings, in the several figures of which like reference numerals identify like elements, and in which:

DETAILED DESCRIPTION

While the present invention is susceptible of embodiments of various forms, there is shown in the drawings, and will hereinafter be described some exemplary and non-limiting embodiments, with the understanding that the present disclosure is to be considered an exemplification of the invention. It is not intended to limit the invention to the specific embodiments illustrated.

In general terms, one embodiment of the connection system is for connecting a plurality of components together. One embodiment of a method of the system comprises providing a dowel having first and second portions. Each of the portions has first and second ends, the first and second portions being connected to one another at their second ends. At least one portion of the first and second portions has at least three dowel sections of successively decreasing diameters. One of these dowel sections has a side wall and an end wall that forms the first end of a respective portion and each of the other dowel sections has a side wall and step wall. An embodiment of the method further comprises providing a first component having a first opening configured to substantially fit the first portion, and a second component having a second opening configured to substantially fit the second portion. An adhesive material is then applied on at least part of the first portion, and the first portion is inserted into the first opening in the first component. Adhesive material is then also applied on at least a part of the second portion, and the second portion is inserted into the second opening in the second component, thereby connecting together the two components.

Figure 1:
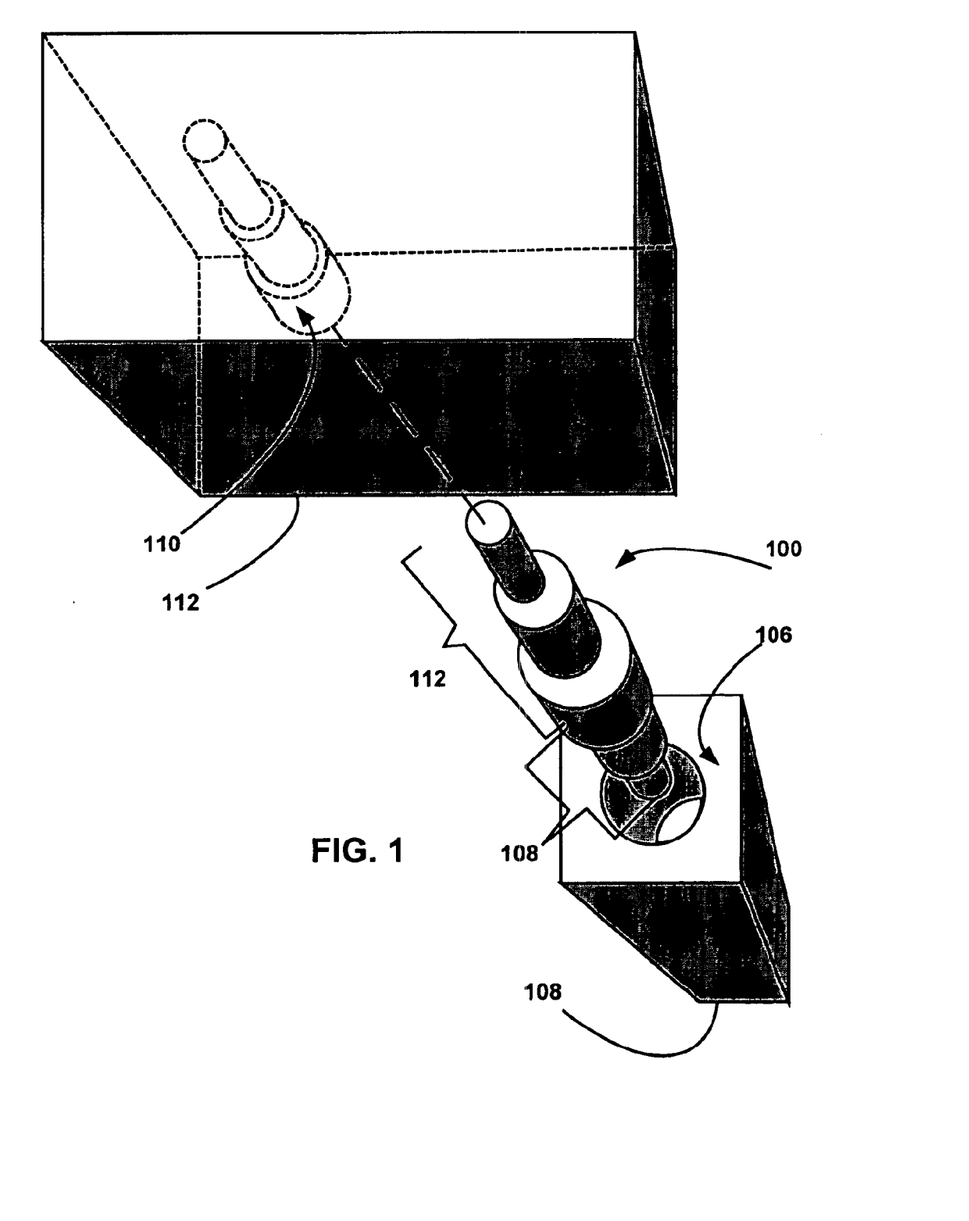
FIG. 1 is a perspective view of one embodiment of the dowel connection system.
Figure 2:
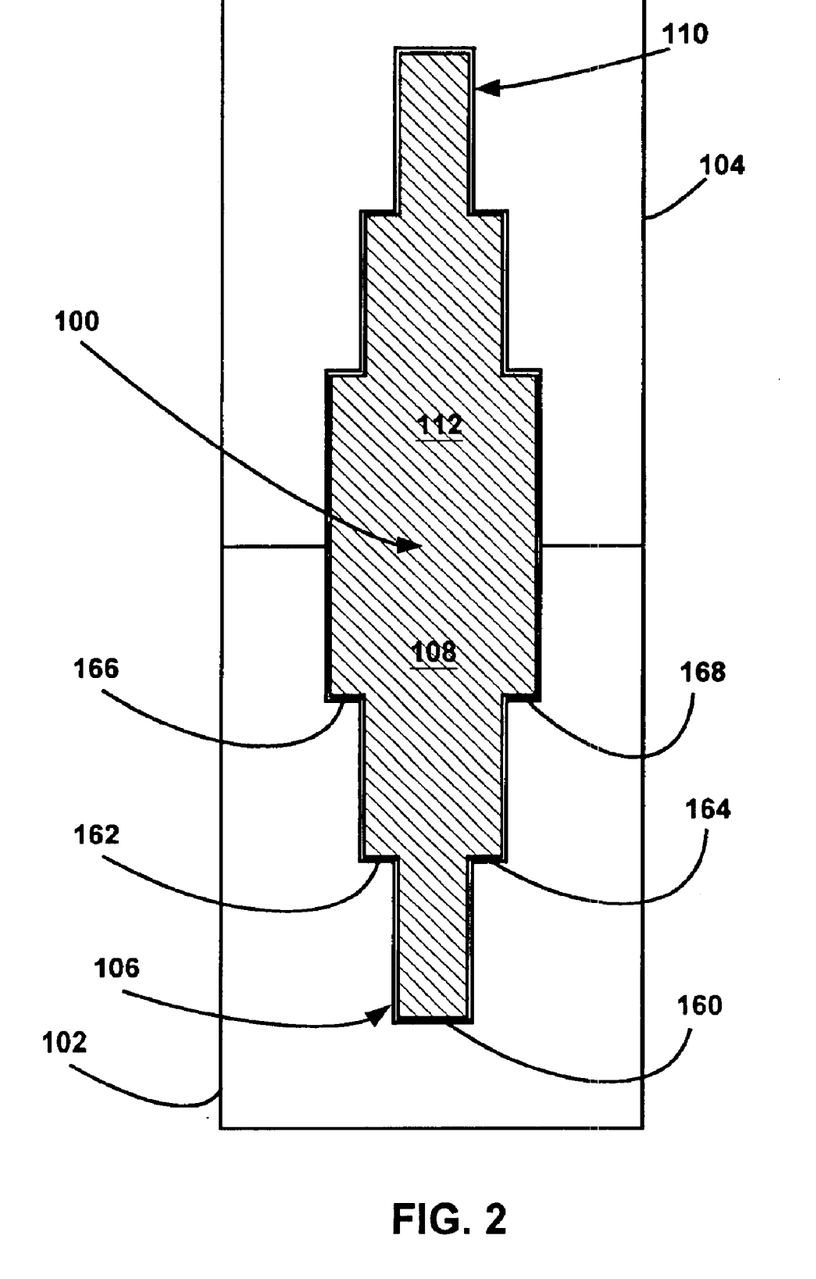
FIG. 2 is a side view of one embodiment of the dowel connection system.

The dowel connection system is depicted in one embodiment in FIGS. 1 and 2. In this embodiment, a dowel 100 holds together first and second components 102, 104. The first component 102 has a first opening 106 and is configured to substantially fit a first portion 108 of the dowel 100. The second component 104 has an opening 110, which is configured to substantially fit a second portion 112 of the dowel 100.

Figure 3:
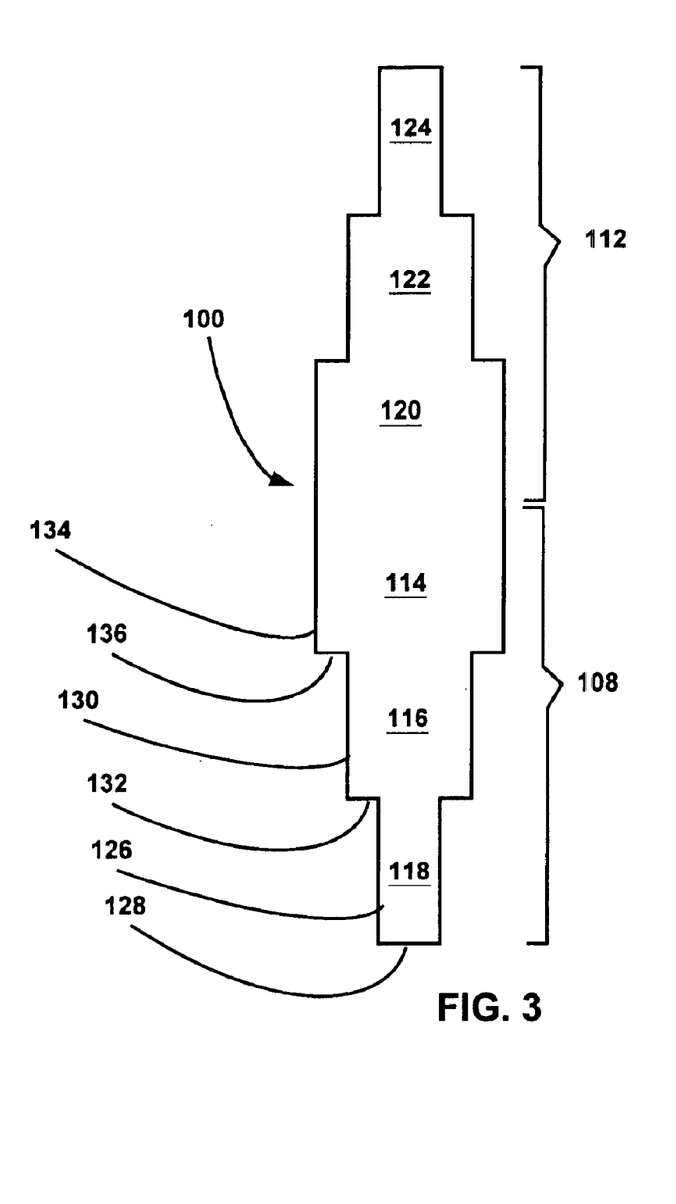
FIG. 3 is a side view of one embodiment of a dowel used in the dowel connection system.
Figure 4:
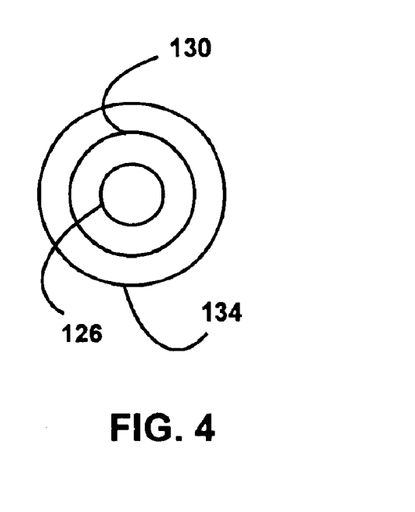
FIG. 4 is an end view of the embodiment of the dowel depicted in FIG. 2.

One embodiment of the dowel 100 is depicted in an embodiment in FIGS. 3 and 4. The dowel 100 may have a first portion 108 formed by dowel sections 114, 116, and 118, and a second portion 112 formed by dowel sections 120, 122, and 124. For each of the first and second portions 108, 112, the dowel sections 118, 124 may have side walls 126, 140 and end walls 128, 142, respectively. Each of the other dowel sections 116, 114, 120, 122 may have side walls 130, 134, 144, 148 and step walls 132, 136, 146, 150, respectively. It is to be understood that the dowel 100 may have more than three dowel sections in various other embodiments. The dowel 100 may have other configurations, such as, the dowel shown and described in U.S. Pat. No. 6,267, 527, which is hereby incorporated by reference.

As shown in FIG. 4, an embodiment is depicted having dowel sections 118, 116, 114, which have a circular configuration. Other embodiments of the dowel 100 may be constructed so that each dowel section has a substantially square, triangular, or other cross-section. Furthermore, the dowel may be configured such that the first and second portions 108, 112 of the dowel 100 have different cross sections or they may have identical cross sections.

Figure 5:
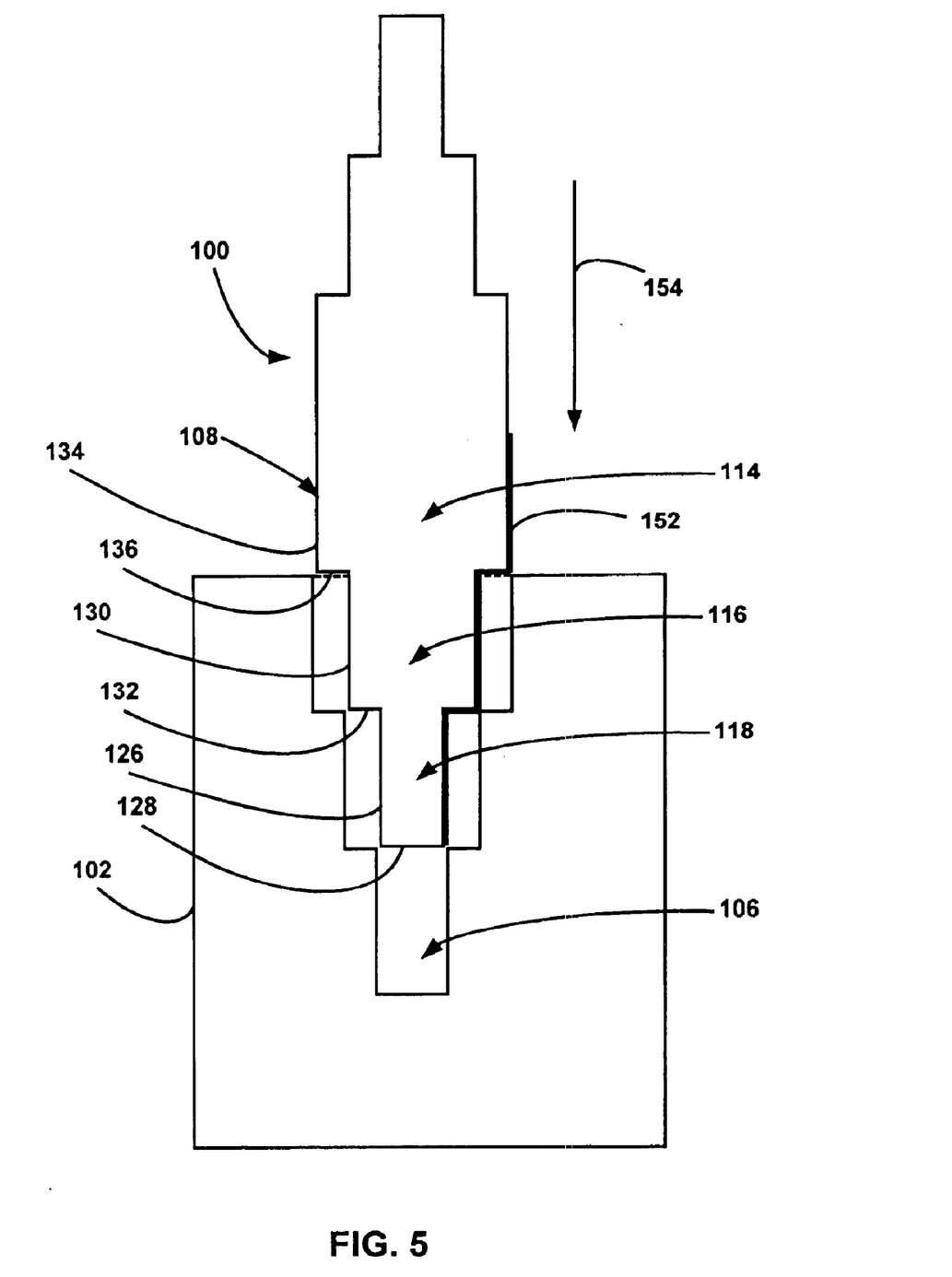
FIG. 5 is a cross sectional view depicting insertion of an embodiment of the dowel in a configured hole in a component.

Referring now to FIG. 5, an adhesive material 152 may be applied to a part or to the entire outer surface of, for example, the first portion 108 of the dowel 100. One or more of the various surfaces of the dowel 100 may be multi-grooved, or spiral grooved, or may have other patterns of grooves or similar structures (see FIG. 7). The dowel 100 may then be inserted into an opening 106 in the first component 102 in the direction of arrow 154. With this embodiment trapping of a large amount of air or adhesive material in a bottom area of the hole 106 is avoided as the dowel 100 is inserted. Only a small amount of air and/or adhesive material is trapped in the bottom area of the hole 106, because as the dowel 100 is inserted into the hole 106 air is displaced by the leading dowel sections. For example, when the dowel 100 is in the intermediate position depicted in FIG. 5, a significant amount of air has already been displaced from the hole 106 by dowel sections 116 and 118.

As the dowel 100 is inserted further into the hole 106 in the first component 102, the adhesive material 108 may be at least partly scrapped from the side walls 126, 130, and 134 of the dowel sections 118, 116, and 114, respectively. As a result, the adhesive material may accumulate at the end wall 128 of the dowel section 118, at the step wall 132 of the dowel section 116 and, at the step wall 136 of the dowel section 114. Thus, there is provided multiple areas of adhesive attachment of the first portion 108 to the second component 102. In FIG. 1, the build up of adhesive material may occur at areas 160, 162, 164, 166, and 168.

Thus, it can be appreciated that in the embodiment depicted in FIGS. 1–4, the insertion of the dowel 100 into the hole 106 in the first component 102, for example, results in an adhesive material accumulation to the areas 160, 162, 164, 166, and 168, with a decreased hydraulic pressure as compared to prior art dowel connection systems. Furthermore, the stepped configuration of the dowel 100 provides easier alignment of the dowel 100 with the hole 106 during the insertion process, and significant pressure need be only applied to the dowel 100 during, for example, approximately the last 20 percent of the insertion distance.

Figure 6:
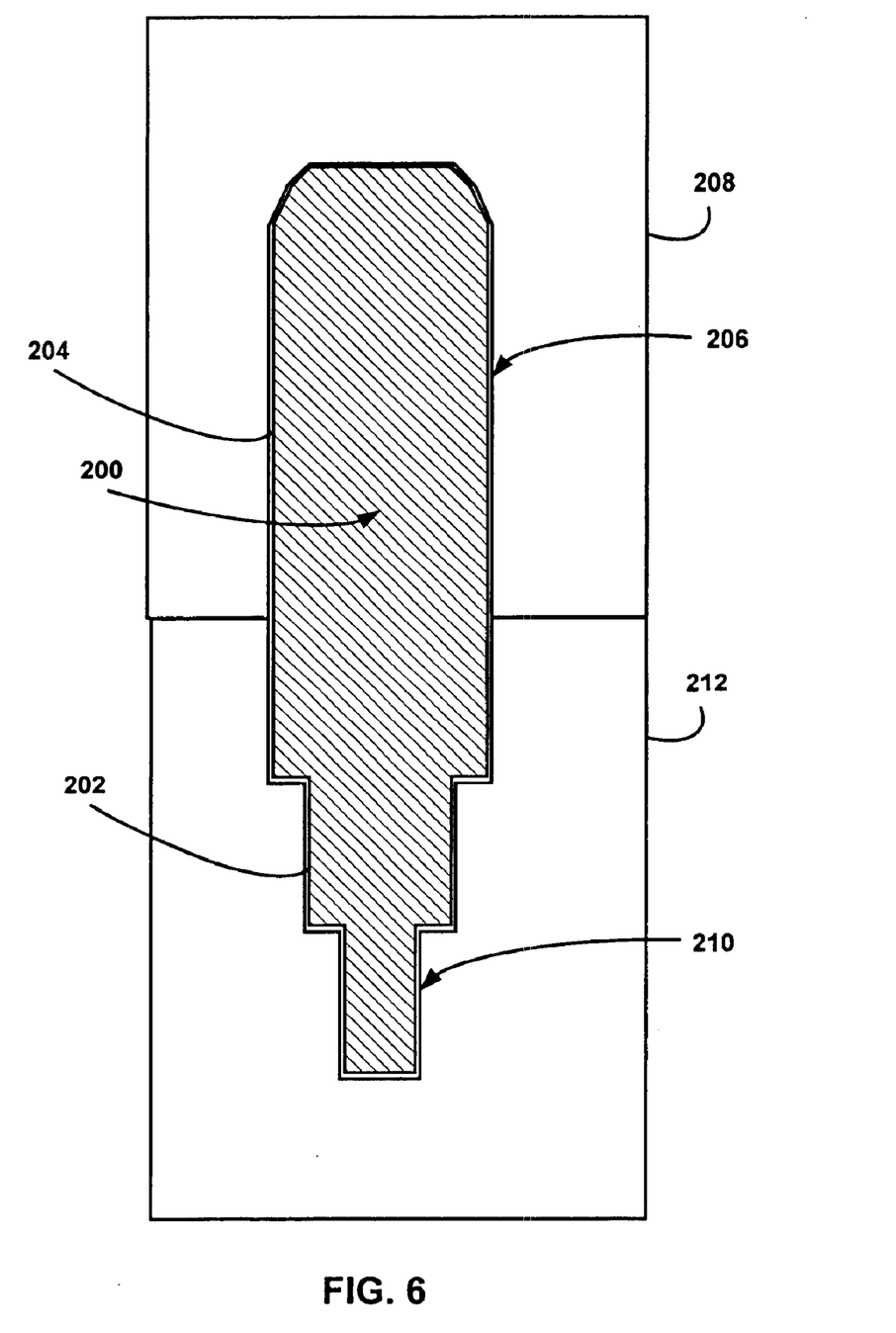
FIG. 6 is a cross sectional view of an alternative embodiment of the dowel connection system.

FIG. 6 depicts another embodiment of the dowel connection system that utilizes a dowel 200 having a first portion 202 that is configured with steps as described in the embodiment depicted in FIGS. 1–4, for example. In this embodiment depicted in FIG. 6, a second portion 204 of the dowel 200 may be a substantially non-stepped portion. An adhesive material is applied to the second portion 204, and the second portion 204 is then inserted into a hole 206 of a second component 208. After the adhesive material on the second component 204 has securely attached the dowel 200 to the second component 208, adhesive material may be applied to the first portion 202 of the dowel 200. The first portion 202 may then be inserted into a hole 210 in a first component 212. The first and second components 212, 208 are thus joined together.

Figure 7:
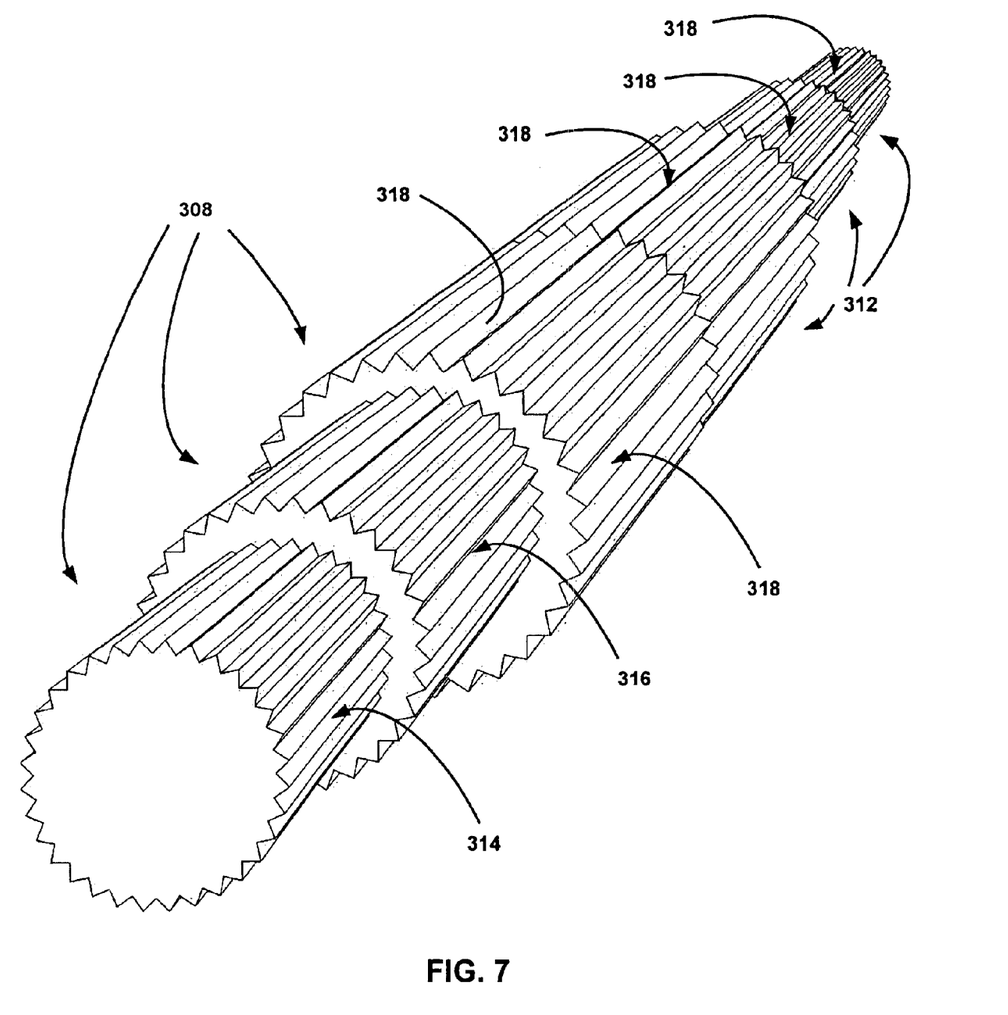
FIG. 7 is a perspective view of an embodiment of a multi-grooved dowel for use in the dowel connection system.

FIG. 7 depicts another embodiment of a dowel 300 for use in the dowel connection system. The dowel 300 is a multi-grooved dowel having the grooves 302 that allow air (and glue, if glue has been applied to the surface of the dowel) to escape as the dowel is inserted into a respective opening in a respective component. One or more of the various surfaces of the dowel 300 may be multi-grooved, or spiral grooved, or may have other patterns of grooves or similar structures. The groove structure may be a single groove (kerf) or may be multi-grooved with a V-shape, for example, as depicted in FIG. 7, or other cross sectional shapes, such as U-shaped. The dowel 300 may have a first portion 308 formed by dowel sections 314, 316, and 318, and a second portion 312 formed by dowel sections 320, 322, and 324. It is to be understood that the dowel 300 may have more than three dowel sections in various other embodiments. It is also to be understood that the first and second portions 308, 312 may be formed of one material, such as wood, plastic, etc. Alternatively, the first and second portions 308, 312 (as well as respective sections thereof) may be formed separately and then joined together.

Figure 8:
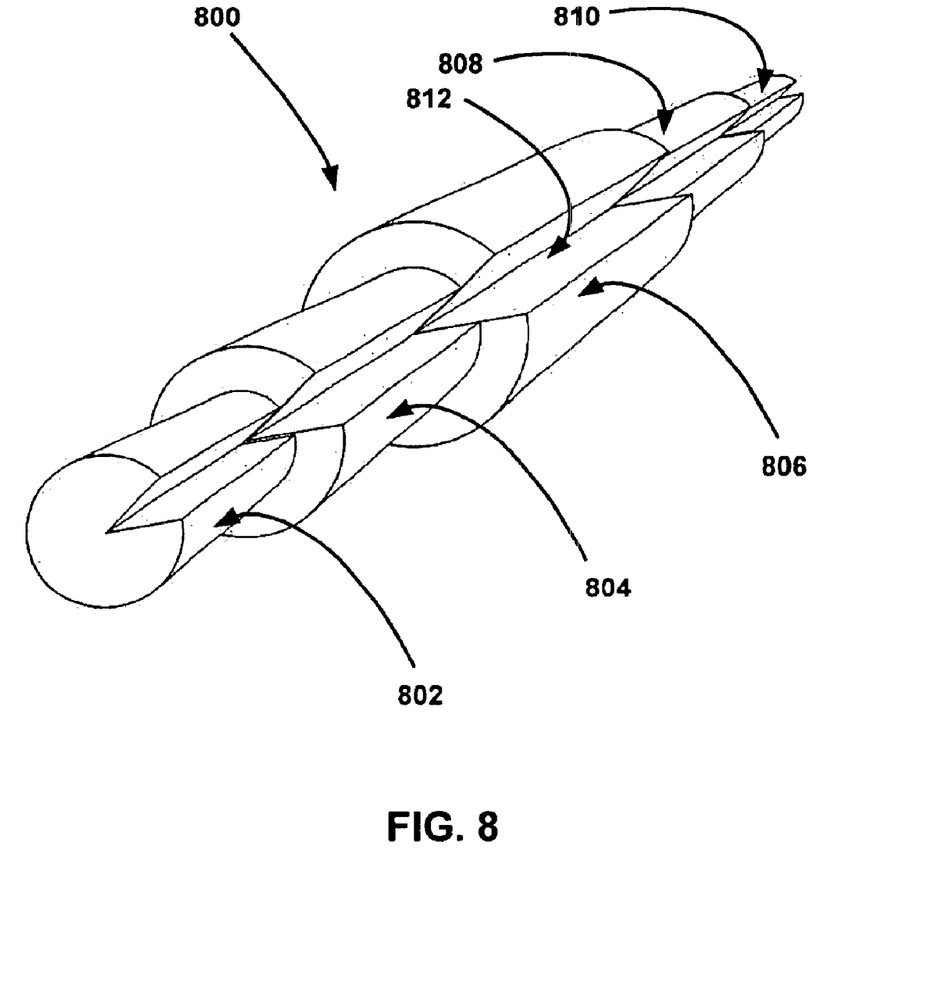
FIG. 8 is a perspective view of another embodiment of a dowel for use in the dowel connection system.

FIG. 8 depicts another embodiment of a dowel 800 for use in the dowel connection system. The dowel 800 is a dowel having a single kerf 812 that allows air (and glue, if glue has been applied to the surface of the dowel) to escape as the dowel 800 is inserted into a respective opening in a respective component. The kerf 812 (shown exaggerated in FIG. 8 for purposes of clarity) may extend through all portions 802, 804, 806, 808, 810 of the dowel 800 to create a continuous channel along the dowel 800.

Figure 9:
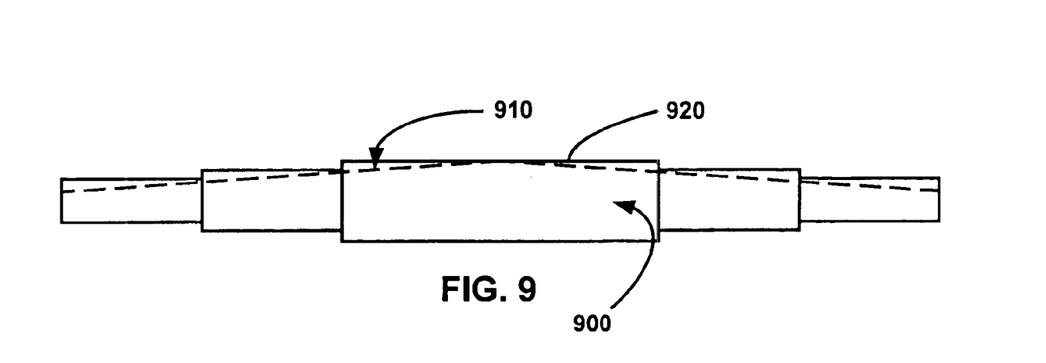
FIG. 9 is a cross sectional view of a further embodiment of a dowel for use in the dowel connection system.
Figure 10:
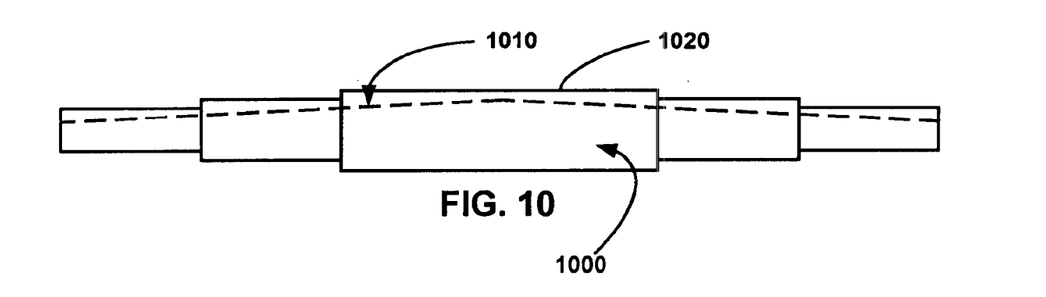
FIG. 10 is a cross sectional view of yet another embodiment of a dowel for use in the dowel connection system.

As shown in the cross sectional view of FIG. 9 the kerf 910 may continue across the center area of the center portion 920 of the dowel 900. Alternatively, as depicted in the cross sectional view of FIG. 10, the kerf 1010 may taper to the surface of the center area of the center portion 1020 of the dowel 1000.

The material selection for the dowel may be dictated by such factors as: the dimensions of the dowel sections, the number of dowel sections, and the material type and dimensions of the components, which are connected together by the dowel. Embodiments of the dowel may be constructed from different types of wood, such as, for example, maple, fir, birch, cedar, or pine. In other embodiments, the dowel may be constructed of plastic, metal, or any other type of material that will provide for proper operation of the dowel. The dowel may also be constructed of a combination of two or more materials. Numerous types of know adhesive materials may be used for securing the dowel to the components.

The actual configuration of the steps formed by the dowel sections may have a variety of different shapes, for example, the step portions may be beveled or convex, as well as being at a substantially 90 degree angle with respect to the side wall of the dowel section.

The dowel and its various embodiments provide a superior connection for components, such as furniture parts. Using the dowel connection system, furniture parts may be readily attached together without the problems of the dowels being pushed out of a respective furniture component by hydraulic or other pressures that build up in the hole when the dowel is inserted therein. Also, embodiments of the dowel connection system provide greater holding power because the adhesive material is disbursed into different various locations or areas between the dowel and the hole in the component and because there is decreased hydraulic pressure. This decreased pressure prevents the dowel from being pushed out of the hole thereby separating the furniture parts. Insertion of the dowel is improved because alignment of the dowel is easier due to its stepped configuration and due to the fact that increased pressure needs only be applied during the last, for example, 20 percent of the insertion distance. The insertion distance where increased pressure needs to be applied obviously depends upon the configuration and length of each of the dowel sections. Each of the dowel sections may have different lengths or may have equal lengths. Thus, the increased pressure for inserting the dowel into the opening in the component may be greater or less than twenty percent of the insertion distance.

The present invention is not limited to the particular details of the apparatus and method depicted, and other applications are contemplated. Certain other changes may be made in the above-described apparatus and method without departing from the true spirit and scope of the invention herein involved. It is intended, therefore, that the subject matter in the above depicted shall be interpreted as illustrative and not in a limiting sense.

What is claimed is:

1. A method for connecting a plurality of components together, comprising the steps of:
providing a dowel having first and second portions, each of the portions having first and second ends, the first and second portions connected to one another at the second ends thereof, at least one portion of the first and second portions having at least three dowel sections of successively decreasing diameters, one dowel section having a side wall and an end wall that forms the first end of the at least one portion and each of the other dowel sections having a side wall and a step wall;
providing at least a first component having a first opening configured to substantially fit the first portion, and a second component having a second opening configured to substantially fit the second portion;
applying an adhesive material on at least part of the first portion;
inserting the first portion into the first opening in the first component;
applying an adhesive material on at least part of the second portion; and
inserting the second portion into the second opening in the second component.

2. The method according to claim 1, wherein the method further comprises providing a transverse cross-section of each of the first and second portions that is one of substantially circular in shape, square in shape, and triangular in shape.

3. The method according to claim 1, wherein the method further comprises providing each step with substantially a convex shape.

4. The method according to claim 1, wherein the method further comprises providing each step with a substantially concave shape.

5. The method according to claim 1, wherein the method further comprises providing a dowel that is constructed of at least two different materials.

6. The method according to claim 1, wherein the method further comprises providing a dowel that is formed from a common material.

7. The method according to claim 1, wherein the method further comprises providing a dowel section having a smallest diameter that is at least as long as a length of any of the other dowel sections.

8. The method according to claim 1, wherein the method further comprises providing each of the dowel sections with a predetermined length, the lengths being substantially equal to one another.

9. The method according to claim 1, wherein the method further comprises providing each portion of the first and second portions with at least three dowel sections of successively decreasing diameters.

10. The method according to claim 1, wherein the method further comprises providing a surface of at least one section of the sections of at least one of the first and second sections with one of a single kerf or a predetermined pattern of grooves.

11. The method according to claim 10, wherein the predetermined pattern of grooves is a multi-groove pattern.

12. A method for connecting a plurality of components together, comprising the steps of:
providing a dowel having first and second portions, each of the portions having first and second ends, the first and second portions connected to one another at the second ends thereof, at least one portion of the first and second portions having at least three dowel sections of successively decreasing diameters, one dowel section having a side wall and an end wall that forms the first end of the at least one portion and each of the other dowel sections having a side wall and a step wall;
providing at least a first component having a first opening configured to substantially fit the first portion, and a second component having a second opening configured to substantially fit the second portion;

applying an adhesive material on at least part of the first portion and on at least part of the second portion; and inserting the first portion into the first opening in the first component and inserting the second portion into the second opening in the second component to there by connect together the first and second components.

13. The method according to claim 12, wherein the method further comprises providing a transverse cross-section of each of the first and second portions that is one of substantially circular in shape, square in shape, and triangular in shape.

14. The method according to claim 12, wherein the method further comprises providing each step with substantially a convex shape.

15. The method according to claim 12, wherein the method further comprises providing each step with a substantially concave shape.

16. The method according to claim 12, wherein the method further comprises providing a dowel that is constructed of at least two different materials.

17. The method according to claim 12, wherein the method further comprises providing a dowel that is formed from a common material.

18. The method according to claim 12, wherein the method further comprises providing a dowel section having a smallest diameter that is at least as long as a length of any of the other dowel sections.

19. The method according to claim 12, wherein the method further comprises providing each of the dowel sections with a predetermined length, the lengths being substantially equal to one another.

20. The method according to claim 12, wherein the method further comprises providing each portion of the first and second portions with at least three dowel sections of successively decreasing diameters.

21. The method according to claim 12, wherein the method further comprises providing a surface of at least one section of the sections of at least one of the first and second sections with one of a single kerf or a predetermined pattern of grooves.

22. The method according to claim 21, wherein the predetermined pattern of grooves is a multi-groove pattern.

23. A method for connecting components together, comprising the steps of:

providing a wood dowel having first and second portions, each of the portions having first and second ends, the first and second portions connected to one another at the second ends thereof, each respective portion of the first and second portions respectively having at least three dowel sections of successively decreasing diameters, one dowel section having a side wall and an end wall that forms the first end of the respective portion and each of the other dowel sections of the respective portion having a side wall and a step wall;

providing a surface of each of the dowel sections of the first and second sections with one of a single kerf or a predetermined pattern of grooves;

providing at least a first component having a first opening configured to substantially fit the first portion, and a second component having a second opening configured to substantially fit the second portion;

applying an adhesive material on at least part of the first portion and on at least part of be second portion;

partially inserting the first portion into the first opening in the first component such that a majority of air in the first opening in the first component is displaced and partially inserting the second portion into the second opening in the second component such that a majority of air in the second opening in the second component is displaced; and fully inserting the first portion into the first opening in the first component and fully inserting the second portion into the second opening in the second component to thereby connect together the first and second components, the adhesive material respectively accumulating in areas of the step walls and end walls.

24. The method according to claim 23, wherein the method further comprises providing a transverse cross-section of each of the first and second portions that is one of substantially circular in shape, square in shape, and triangular in shape.

25. The method according to claim 23, wherein the method further comprises providing a dowel that is constructed of at least two different materials.

26. The method according to claim 23, wherein the method further comprises providing a dowel that is formed from a common material.

27. The method according to claim 23, wherein the method further comprises providing a dowel section having a smallest diameter that is at least as long as a length of any of the other dowel sections.

28. The method according to claim 23, wherein the method further comprises providing each of the dowel sections with a predetermined length, the lengths being substantially equal to one another.

29. The method according to claim 23, wherein the method further comprises providing each portion of the first and second portions with at least three dowel sections of successively decreasing diameters.

30. The method according to claim 23, wherein the predetermined pattern of grooves is a multi-groove pattern.

31. A system for connecting first and second wood components together, comprising:

a wood dowel having first and second portions, each of the portions having first and second ends, the first and second portions connected to one another at the second ends thereof, each respective portion of the first and second portions respectively having at least three dowel sections of successively decreasing diameters, one dowel section having a side wall and an end wall that forms the first end of the respective portion and each of the other dowel sections of the respective portion having a side wall and a step wall;

the first wood component having a first opening having at least three sections of successively decreasing diameters and being configured to substantially fit the first portion, and the second wood component having a second opening having at least three sections of successively decreasing diameters and being configured to substantially fit the second portion;

an adhesive material on at least part of the first portion and on at least part of the second portion; and the first portion positioned in the first opening in the first wood component and the second portion positioned in the second opening in the second wood component to thereby connect together the first and second wood components, a majority of the adhesive material respectively located in areas of the step walls and end walls.

32. The system according to claim 31, wherein the system further comprises a surface of at least one section of the sections of at least one of the first and second sections with one of a single kerf or a predetermined pattern of grooves.

33. The system according to claim 31, wherein the predetermined pattern of grooves is a multi-groove pattern.

34. A system for connecting first and second wood components together, comprising:

a unitary wood dowel having first and second portions, each of the portions having first and second ends, the first and second portions connected to one another at the second ends thereof, each respective portion of the first and second portions respectively having at least two dowel sections of successively decreasing diameters, one dowel section having a side wall and an end wall that forms the first end of the respective portion and each of the other dowel sections of the respective portion having a side wall and a step wall;

the first wood component having a first opening having at least two sections of successively decreasing diameters and being configured to substantially fit the first portion, and the second wood component having a second opening having at least two sections of successively decreasing diameters and being configured to substantially fit the second portion;

an adhesive material on at least part of the first portion and on at least part of the second portion; and the first portion positioned in the first opening in the first wood component and the second portion positioned in the second opening in the second wood component to thereby connect together the first and second wood components.

35. The system according to claim 34, wherein the step walls have a substantially convex shape.

36. The system according to claim 34, wherein the step walls have a substantially concave shape.

37. The system according to claim 34, wherein the dowel is a common material.

38. The system according to claim 34, wherein the dowel section with the smallest diameter is at least as long as a length of any of the other dowel sections.

39. The system according to claim 34, wherein each of the dowel sections has a predetermined length, the lengths being substantially equal to one another.

40. The system according to claim 34, wherein the side wall of at least one section has a single kerf or a predetermined pattern of grooves.

41. The system according to claim 40, wherein the predetermined pattern of grooves is a multi-groove pattern.

* * * * *